United States Patent
Bosen et al.

(10) Patent No.: US 9,270,115 B2
(45) Date of Patent: Feb. 23, 2016

(54) DOMESTIC APPLIANCE COMPRISING A COMMUNICATION UNIT, SYSTEM OF APPLIANCES AND METHOD FOR OPERATING A DOMESTIC APPLIANCE

(75) Inventors: Peter Bosen, Sinzing (DE); Claudia Häpp, München (DE)

(73) Assignee: BSH Hausgeraete GmbH, Munich (DE)

( * ) Notice: Subject to any disclaimer, the term of this patent is extended or adjusted under 35 U.S.C. 154(b) by 720 days.

(21) Appl. No.: 13/384,246

(22) PCT Filed: Jul. 8, 2010

(86) PCT No.: PCT/EP2010/059807
§ 371 (c)(1),
(2), (4) Date: Jan. 16, 2012

(87) PCT Pub. No.: WO2011/006830
PCT Pub. Date: Jan. 20, 2011

(65) Prior Publication Data
US 2012/0124401 A1    May 17, 2012

(30) Foreign Application Priority Data
Jul. 17, 2009    (DE) .................. 10 2009 027 800

(51) Int. Cl.
*H02J 3/14*    (2006.01)
*H02J 13/00*    (2006.01)

(52) U.S. Cl.
CPC .............. *H02J 3/14* (2013.01); *H02J 13/0013* (2013.01); *H02J 2003/143* (2013.01);
(Continued)

(58) Field of Classification Search
CPC ....... H02J 2003/143; H02J 3/14; H02J 13/02; A47L 15/0063; Y02B 70/3225; Y02B 70/3266; Y02B 90/2615; H04L 12/2803; H04L 12/282; H04L 12/2827; H04L 2012/285; D06F 33/02; D06F 39/005; G06Q 50/06
USPC ........................ 700/295, 296, 297, 286, 291
See application file for complete search history.

(56) References Cited

U.S. PATENT DOCUMENTS 5,572,073 A * 11/1996 Burgess et al. ................. 307/38
5,625,236 A *  4/1997 Lefebvre .................. H02J 3/14
                                                        307/38
(Continued)

FOREIGN PATENT DOCUMENTS

EP    0456872 A1    11/1991
EP    0620631 A1    10/1994
(Continued)

OTHER PUBLICATIONS
International Search Report PCT/EP2010/059807.
(Continued)

*Primary Examiner* — Crystal J Barnes-Bullock
(74) *Attorney, Agent, or Firm* — Laurence A. Greenberg; Werner H. Stemer; Ralph E. Locher (57) ABSTRACT

A domestic appliance includes an internal electrical load, a controller for controlling the internal electrical load, and a communication device coupled with the controller. The controller is configured for transmitting via the communication device data to additional domestic appliances, wherein the received data include information about a time of an impending startup of the internal electrical load, and/or for receiving via the communication device data from additional domestic appliances, wherein the received data include information about a time of an impending startup of an electrical load of an additional domestic appliance. The internal electrical load is controlled based on the received information, preventing an overload of the power supply system.

12 Claims, 2 Drawing Sheets

(52) U.S. Cl.
CPC ......... *Y02B 70/3225* (2013.01); *Y02B 70/3266* (2013.01); *Y02B 90/2607* (2013.01); *Y04S 20/222* (2013.01); *Y04S 20/242* (2013.01); *Y04S 40/12* (2013.01)

(56) References Cited

U.S. PATENT DOCUMENTS

| | | | | |
|---|---|---|---|---|
| 5,793,125 | A * | 8/1998 | Tarng | 307/117 |
| 5,875,430 | A * | 2/1999 | Koether | G06Q 30/04 700/2 |
| 6,603,218 | B1 * | 8/2003 | Aisa | H02J 3/14 307/31 |
| 6,853,291 | B1 * | 2/2005 | Aisa | 340/3.3 |
| 6,950,010 | B2 * | 9/2005 | Aisa | 340/12.37 |
| 6,980,079 | B1 * | 12/2005 | Shintani | H04L 12/2803 340/3.1 |
| 7,034,707 | B2 * | 4/2006 | Aisa | 340/662 |
| 7,110,832 | B2 * | 9/2006 | Ghent | D06F 33/02 307/39 |
| 7,149,605 | B2 * | 12/2006 | Chassin et al. | 700/295 |
| 7,336,192 | B2 * | 2/2008 | Aisa | 340/662 |
| 7,363,031 | B1 * | 4/2008 | Aisa | 455/419 |
| 7,561,977 | B2 * | 7/2009 | Horst et al. | 702/62 |
| 7,705,484 | B2 * | 4/2010 | Horst | 307/35 |
| 2003/0009265 | A1 * | 1/2003 | Edwin | 700/295 |
| 2003/0036820 | A1 * | 2/2003 | Yellepeddy et al. | 700/291 |
| 2003/0225483 | A1 * | 12/2003 | Santinato et al. | 700/295 |
| 2004/0075343 | A1 * | 4/2004 | Wareham et al. | 307/39 |
| 2004/0128266 | A1 * | 7/2004 | Yellepeddy et al. | 705/412 |
| 2005/0216131 | A1 * | 9/2005 | Sodemann et al. | 700/295 |
| 2006/0207269 | A1 * | 9/2006 | Jung et al. | 62/130 |
| 2008/0015742 | A1 * | 1/2008 | Kulyk et al. | 700/295 |
| 2008/0091284 | A1 * | 4/2008 | Sugiyama et al. | 700/90 |
| 2009/0151750 | A1 * | 6/2009 | Ecker et al. | 134/18 |
| 2009/0195070 | A1 * | 8/2009 | Takegami et al. | 307/31 |
| 2009/0299541 | A1 * | 12/2009 | Park et al. | 700/295 |
| 2010/0207448 | A1 * | 8/2010 | Cooper et al. | 307/20 |
| 2010/0207728 | A1 * | 8/2010 | Roscoe et al. | 340/10.1 |

FOREIGN PATENT DOCUMENTS

| | | | | |
|---|---|---|---|---|
| EP | 727668 | A1 * | 8/1996 | G01R 11/00 |
| EP | 0727668 | A1 | 8/1996 | |
| EP | 1018793 | A2 | 7/2000 | |
| EP | 1263108 | A1 | 12/2002 | |
| EP | 1434056 | A2 * | 6/2004 | |
| EP | 1441430 | A1 * | 7/2004 | H02J 3/14 |
| EP | 1640824 | A1 * | 3/2006 | |
| WO | WO 2006049356 | A1 * | 5/2006 | H02J 3/14 |
| WO | WO 2006089718 | A2 * | 8/2006 | H02J 1/10 |

OTHER PUBLICATIONS

Report of Examination DE 10 2009 027 800.1.
English Translation of Office Action issued for corresponding Chinese Application No. 201080032083.2, mailed Sep. 3, 2013 (8 pages).
P. Palensky et al., "Demand Side Management in Private Homes by Using LONWORKS®", Factory Communication Systems, Oct. 1, 1997, pp. 341-347.

\* cited by examiner

DOMESTIC APPLIANCE COMPRISING A COMMUNICATION UNIT, SYSTEM OF APPLIANCES AND METHOD FOR OPERATING A DOMESTIC APPLIANCE

BACKGROUND OF THE INVENTION

The invention relates to a domestic appliance having an internal electrical load, a controller for controlling the internal electrical load and a communication device coupled to the controller and via which the controller sends data to additional domestic appliances and/or receives data from additional domestic appliances. The invention also relates to an appliance system comprising at least two domestic appliances and to a method for operating a domestic appliance.

It is normal in households to allow a plurality of domestic appliances to run simultaneously, namely by way of example a washing machine, a dishwasher, a tumble dryer and a refrigerator. If the domestic appliances run through the respective programs without regard for the other domestic appliances respectively, a maximum admissible power consumption may be exceeded in the household or peak loads can be generated which overload the electrical power supply. This occurs by way of example due to simultaneously switching on large loads in different domestic appliances. These large loads may, by way of example, be a heater, an electric motor and a compressor. One particular challenge with simultaneous operation of a plurality of domestic appliances lies in not exceeding the maximum admissible power consumption or configuring the power consumption of individual domestic appliances in such a way that the electrical power supply is loaded as little as possible.

An appliance system is known from EP 0 727 668 A1 which includes a large number of domestic appliances which communicate with each other. The domestic appliances communicate with each other via a communication bus. A total power consumed by the domestic appliances is measured by a measuring device. The measuring device sends data via the communication bus which include information about the respective instantaneous total power. Each domestic appliance can tap the same data at the communication bus and adjust a separate power consumption by taking the information contained in the data into consideration. The domestic appliances compare the respective momentary total power with a predetermined limiting value. If the total power exceeds the predetermined limiting value the domestic appliances reduce their own power consumption. In other words, the power consumed by the domestic appliances is only reduced if the total power has already exceeded the limiting value. Peak loads can be produced in the household as a result and these overload the electrical power supply.

BRIEF SUMMARY OF THE INVENTION

It is the object of the invention to disclose a solution as to how a large number of domestic appliances can be particularly reliably operated in a household.

An inventive domestic appliance comprises an internal electrical load. The domestic appliance also comprises a controller for controlling the internal electrical load and a communication device coupled to the controller. The controller is designed to send data to additional domestic appliances and/or to receive data from additional domestic appliances via the communication device.

In the case of sending it is provided that the controller sends data via the communication device which include information about a time of an impending startup of the internal electrical load. In other words, the controller can inform other domestic appliances about the time of a planned startup of the internal electrical load. The other domestic appliances can hereby configure their program sequences as a function of this information, namely, for example, such that simultaneous operation of two or more large loads is avoided and/or a predetermined limiting value for the total power consumption in the household is not exceeded and/or a uniform distribution of the power consumption of all domestic appliances is achieved over time. Peak loads, and hereby overloading of the electrical power supply, may therefore be avoided. For example, startup of an electrical load of an additional domestic appliance can be brought forward or postponed as a function of the information about the time of startup of the internal electrical load. In this way it is possible to actually avoid a predetermined maximum admissible limiting value for the total power consumption being exceeded or for the power consumption to be uniformly divided. Compared with the subject matter according to document EP 0 727 668 A1, in which corresponding measures are only taken once the predetermined limiting value for the total power has been exceeded, the inventive procedure represents a significant improvement. The program sequences of a plurality of domestic appliances can namely be coordinated with each other such that the predetermined limiting value for the total power consumption is not exceeded at all and/or a uniform distribution of the power consumption over time is attained.

In the case of receiving it is provided that the controller extracts from the received data information about a time of an impending startup of an electrical load of an additional domestic appliance and controls the internal electrical load by taking this information into consideration. In other words, the controller can receive information about the time of startup of an electrical load of an additional domestic appliance, process it and control the internal electrical load as a function of this information. In this way it is possible to design the sequence of operation of the internal electrical load as a function of the received information in such a way that simultaneous operation of a plurality of large loads is avoided or a predetermined limiting value for the total power consumption of a plurality of domestic appliances is not exceeded and/or an optimally uniform division of the power consumption is achieved. As a function of the received information the domestic appliance can namely bring forward or postpone the time of startup of the internal electrical load, for example, so the electrical power supply is loaded as little as possible.

In the present case a domestic appliance is taken to mean an appliance which is used for running a household. This can be a large domestic appliances, such as a washing machine, a tumble dryer, a dishwasher, a cooking appliance, an extractor hood, a refrigerator, a fridge-freezer combination or a an air conditioning unit. However, it can also be a small domestic appliance, such as an automatic coffee machine or a food processor. In particular a domestic appliance is taken to mean an appliance which comprises at least one large load. The definition of the large load can vary depending on application and can, for example, denote an electrical load whose power consumption exceeds 500 Watts by way of example.

The communication device can, for example, include a transmitter and/or receiver via which data can be transmitted to a communication bus in the household and/or data can be tapped at a communication bus. The communication device can be designed for wireless transmitting and/or receiving of data or it can be designed for wired transmitting and/or receiving of data. For example, the communication device can be designed for transmitting and/or receiving data via the electrical power supply or the grid (Power Line Communication). It may also be provided that the communication device is formed solely by a connector by which the controller can be connected to a communication bus. The controller can itself then generate and/or receive data according to a predetermined protocol.

In the case of sending it may be provided that the controller sends data via the communication device which includes information about a duration of impending operation of the internal electrical load. Other domestic appliances can then receive and process this information and bring about certain procedures as a function of this information. In other words, additional domestic appliances can receive information about both the time of startup of the electrical load as well as the duration of its impending operation. The additional domestic appliances therefore receive complete information about planned operation of the internal electrical load. The additional domestic appliances can therefore coordinate their process sequences with each other in such a way that the power consumption in the household is uniformly divided and therefore the electrical power supply is not overloaded. For example, the additional domestic appliances can wait for startup of their loads until operation of the internal load is concluded. The additional domestic appliances can calculate the time of this conclusion from the received information.

In the case of receiving it may be provided that the controller extracts from the received data information about a duration of impending operation of an electrical load of an additional domestic appliance and controls the internal electrical load by taking this information into consideration. The controller can therefore receive and process information about both the time of a startup of an external electrical load as well as the duration of its operation, and control the internal electrical load as a function of this information. This can be, for example, such that the controller brings forward or postpones startup of the internal electrical load to avoid simultaneous operation of a plurality of loads and not overload the electrical power supply. If, for example the controller detects that startup of the external electrical load coincides with startup of the internal load, the controller can postpone startup of the internal load by the duration of operation of the external electrical load.

This embodiment can be implemented in a scenario of this kind for example: a washing machine and a refrigerator are located in a household and are in operation at the same time. Both appliances are connected to a communication bus in the household and they can communicate with each other via this communication bus. A controller in the refrigerator detects that the temperature in the same appliance is increasing and a compressor must be activated. In the process a controller in the washing machine, to initiate a spin cycle, is under the control of a drive motor of a washing drum. The refrigerator controller sends data via the communication bus containing information about the impending startup of the compressor. This information includes the time of startup as well as the duration of the impending operation of the compressor. The washing machine controller taps this data at the communication bus. The washing machine controller accordingly knows the time of startup and the duration of impending operation of the refrigerator compressor. The washing machine controller can therefore wait until operation of the compressor is ended. It can initiate the spin cycle only when compressor operation has ended.

In the case of sending it may be provided that data about a maximum possible interval by which the time of startup of the internal electrical load can be shifted are stored in the controller. The controller can then send the same data via the communication device. Additional domestic appliances in the household can then be informed about the interval by which operation of the internal electrical load can be postponed. The additional domestic appliances can therefore judge whether it is necessary to shift operation of its own electrical load in order not to overload the electrical power supply, or whether the interval by which operation of the internal load is shifted is sufficient. By fixing the maximum possible interval by which operation of the internal electrical load can be postponed the internal electrical load can conclude its operation without having to wait for too long and overloading the electrical power supply. Proper operation of the internal electrical load is therefore ensured on the one hand and the generation of peak loads in the household is avoided on the other hand. Appliance-specific parameters are preferably taken into consideration when fixing the intervals. For example, in the case of a refrigerator the temperature must be taken into consideration. In this case the interval can be selected to be too long in order to maintain the desired temperature in the refrigerator. Accordingly, in the case of a washing machine the fact that a spin cycle or heating of water cannot be arbitrarily postponed must be taken into consideration. The intervals can therefore be predefined so as to be appliance-specific and dependent on the corresponding load whose startup is being postponed.

In the case or receiving it may accordingly be provided that the controller extracts from the received data information about a maximum possible interval by which the time of startup of an electrical load of an additional domestic appliance can be shifted and controls the internal electrical load by taking this information into consideration. In other words, the controller can receive information about the interval by which operation of additional loads in the household can be shifted. This information allows the controller to precisely plan operation of the internal electrical load in terms of time. Using this information the controller can namely determine whether a shift in operation of the internal electrical load is necessary or not. If the maximum possible interval by which operation of the external load can be shifted is sufficient in order not to overload the electrical power supply, the controller can initiate and conclude operation of the internal load as planned. If the maximum possible interval for shifting operation of the external load is not sufficient, the controller can optionally interrupt operation of the internal load and continue it at a later time or shift the time of startup of the internal load.

This embodiment can be implemented in a sequence as follows: a washing machine and a tumble dryer are connected to a communication bus in a household. The washing machine and tumble dryer are operated at the same time. A washing machine controller transmits data to the communication bus which include information about the time of initiation of a spin cycle, the duration of the spin cycle and a maximum possible interval by which the spin cycle can be shifted. A tumble dryer controller transmits data to the communication bus which contains information about the time of startup of a heater and the duration of operation of the heater. The washing machine controller determines that operation of the tumble dryer heater would overlap with the spin cycle, and this would cause a peak load in the household. It simultaneously determines that this may be avoided without much effort by simply postponing the spin cycle by an interval shorter than the maximum possible interval. The washing machine controller accordingly determines that operation of the heater would overlap with the spin cycle of the washing machine and this can be avoided by way of the washing machine controller. Operation of the heater can be neither brought forward nor postponed. The washing machine controller transfers additional data via the communication bus which contains information about the spin cycle being shifted. With this data the washing machine controller is informed of the fact that by postponing the spin cycle the electrical power supply will not be overloaded and no additional safety measures have to be taken. The washing machine controller initiates the spin cycle as soon as the tumble dryer heater has been switched off.

Different intervals by which the time of startup of the internal electrical load may be shifted may also be associated with different programs and/or different sections of a certain program. If the electrical load is a drive motor for driving a washing drum, respectively different intervals can be predefined for a washing operation and a spin cycle. Respectively different intervals for different washing programs, for example for a "delicates program" and a "boil wash program" may be predefined even for a spin cycle. Depending on the instantaneous program and/or section of a program the controller can then send data via the communication device which include information about a maximum possible interval associated with this program or this program section by which the time of startup of the internal load can be shifted.

In the case of sending it may be provided that data about an estimated or an actual power consumption of the internal electrical load are stored in the controller and the controller sends the same data via the communication device. An additional appliance in the household can therefore estimate a total power which is consumed by the internal load and the additional appliance. The additional appliance can therefore judge whether it is necessary to postpone or bring forward operation of an electrical load or not. This may take place, for example, by way of a simple comparison of the estimated total power with a stored limiting value which should not be exceeded. The actual power consumption of the internal load can be a previously measured power or a power averaged over several operations.

In the case of receiving it may be provided that the controller extracts from the received data information about a power consumption of an electrical load of an additional domestic appliance and controls the internal electrical load by taking this information into consideration. The controller can then calculate a total power which is consumed by the electrical load of the additional domestic appliance and the internal electrical load at a certain time. Using this information the controller can determine whether a change in terms of time is required in operation of the internal electrical load or not. If the calculated total power is greater than a predetermined limiting value the controller can divide operation of the internal load over time and/or shift the time of startup of the internal load.

As already stated, the controller can send data containing information about a maximum possible interval by which the time of startup of the internal load can be shifted via the communication device and/or receive data containing information about a maximum possible interval by which the time of startup of an external electrical load can be shifted. Such an interval constitutes as it were a measure of a priority of the respective electrical load. If the electrical load has a high priority, the maximum possible interval can be predefined so as to be low accordingly, and vice versa. However, the situation can occur where operations of a plurality of large loads overlap despite these predefined intervals and despite the shifting of the time of startup of the load. In such a case a decision can be made as to which electrical load has precedence.

It may therefore be provided in the case of sending that data about a level of priority of the internal electrical load are stored in the controller and the controller sends the same data via the communication device. An additional domestic appliance can therefore assess whether it has higher or lower priority and therefore has precedence or not. Reliable operation of a plurality of domestic appliances on a communication bus or in a household can be ensured hereby. Respectively different levels of priority of the internal load can be predefined for different programs and/or sections of a certain program and/or different operating states of the domestic appliance. For example, a drive motor for driving a washing drum in a washing machine can have a lower priority during washing operation than during a spin cycle. A compressor in a refrigerator can accordingly have a lower level of priority if the temperature in the refrigerator is stable and does not increase. If the temperature does increase the level of priority of the compressor can increase. Appliance-specific parameters, such as temperature inter alia, may therefore be taken into consideration when establishing the levels of priority.

In the case of receiving it may be provided that the controller extracts from the received data information about a level of priority of the electrical load of the additional domestic appliance and controls the at least one electrical load by taking this information into consideration. The controller can thus determine which electrical load, namely the internal or external load, has precedence. If the external load has precedence, operation of the internal load can be divided over time and/or the time of its startup can be shifted. If the internal load has precedence over the external load, the internal load can be operated as planned, for example according to a selected program.

As already stated the controller can control the internal electrical load by taking the received information into consideration. In one embodiment it is provided that the controller shifts a time of a startup of the internal electrical load and/or divides impending operation of the internal electrical load over time as a function of the information contained in the received data. If the controller detects for example that impending operation of the internal load would overlap with operation of an external load and that the external load has precedence, the controller can postpone the time of startup of the internal load. Overloading of the electrical power supply is therefore avoided and the respective operations of the external and internal loads can be properly concluded.

In particular the controller can control the internal electrical load as a function of the information contained in the received data in such a way that a total power consumed by the domestic appliance and the additional domestic appliance does not exceed a predetermined limiting value. In this way the situation can be avoided where, for example, a fuse in the electrical power supply is tripped and domestic appliance programs that have already begun are therefore interrupted. By taking the received information into consideration the controller can also control the internal electrical load in such a way that the power consumption of the domestic appliances in the household is uniformly divided over time. Variations in power consumption in the household are avoided therefore and the electrical power supply is not overly loaded. The controller can therefore generally be designed to control the internal load as a function of the received information in such a way that a total power consumed by the domestic appliance and the additional domestic appliance is constant at least for a predetermined interval.

An inventive appliance system comprises at least one first and one second domestic appliance which each include an internal electrical load, a controller for controlling the internal electrical load and a communication device via which the controller sends data to the respective other domestic appliance and receives data from the respective other domestic appliance. The controller of the first domestic appliance and the controller of the second domestic appliance exchange data with each other which include information about a time or an impending startup of the respective internal electrical load.

With an inventive method for operating a domestic appliance an internal electrical load is controlled with the aid of a controller which sends data to additional domestic appliances and/or receives data from additional domestic appliances via a communication device. In the case of sending it is provided that the controller sends data via the communication device which include information about a time of an impending startup of the internal electrical load. In the case of receiving it is provided that the controller extracts from the received data information about a time of an impending startup of an electrical load of an additional domestic appliance and controls the internal electrical load by taking this information into consideration.

The preferred embodiments presented in relation to the inventive domestic appliance and their advantages apply accordingly to the inventive appliance system and to the inventive method.

Further features of the invention emerge from the claims, figures and description of the figures. The features and combinations of features cited above in the description and the features and combinations of features cited hereinafter in the description of the figures and/or illustrated in the figures alone can be used not just in the respectively disclosed combination but also in other combinations or on their own.

BRIEF DESCRIPTION OF THE DRAWINGS

The invention will now be described in more detail with the aid of a preferred exemplary embodiment and with reference to the accompanying drawings, in which.

DETAILED DESCRIPTION OF EXEMPLARY EMBODIMENTS OF THE PRESENT INVENTION

Figure 1:
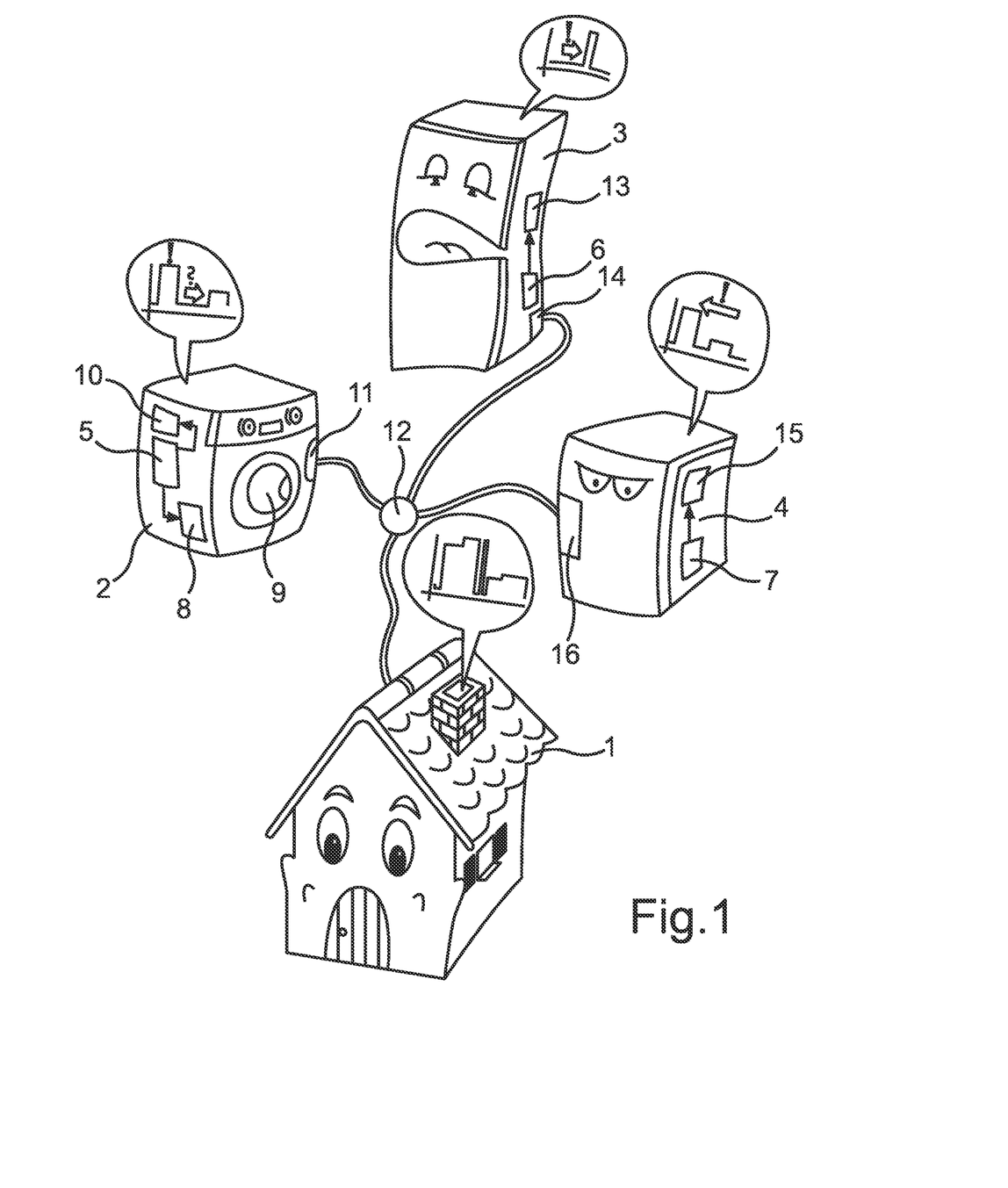
FIG. 1 shows in a schematic diagram an appliance system according to one embodiment of the invention, comprising a large number of domestic appliances connected to a communication bus in a household.

A washing machine 2, a refrigerator 3 and a tumble dryer 4 are situated in a house 1. The appliances 2, 3, 4 each comprise a controller 5, 6, 7 which, for example, may be a microcontroller. The washing machine 2 comprises as electrical loads a drive motor 8 for driving a washing drum 9, and a heater 10. Both the drive motor 8 and the heater 10 are controlled by the controller 5. The washing machine 2 also comprises a communication device 11 via which the controller 5 can transmit data to a communication bus 12 and can tap data from the communication bus 12.

The communication bus 12 can, for example, be formed by an electrical power supply and the data can be transmitted via this power supply (Power Line Communication). Alternatively the appliances 2, 3, 4 can be coupled to each other with the aid of a communication bus that is separate from the electrical power supply. As a further alternative it may be provided that the data is transmitted wirelessly between the appliances 2, 3, 4.

The refrigerator 3 comprises a compressor 13 which can be controlled by the controller 6. The refrigerator 3 also comprises a communication device 14 via which the controller 6 can send data to the communication bus 12 and receive data.

The tumble dryer 4 comprises as an electrical load a heater 15 which is controlled by the controller 7. The tumble dryer 4 is connected by a communication device 16 to the communication bus 12.

The following data by way of example may be stored in the controller 5 of the washing machine 2:
- data containing information about a time of startup of the drive motor 8 following starting of a washing program; this applies in particular to a spin cycle in which the drive motor 8 is operated at high rotational speeds,
- data containing information about the duration of operation of the drive motor 8,
- data containing information about a maximum possible interval $\Delta t$ by which the time of startup of the drive motor 8, i.e. the time of initiation of a spin cycle, can be shifted, namely brought forward and postponed,
- data containing information about a power consumption of the drive motor 8,
- data containing information about a level of the priority of the drive motor 8.

Data relating to the heater 10 by way of example may also be stored in the controller 5 of the washing machine 2:
- data containing information about a time of startup of the heater 10 following the start of a washing program,
- data containing information about a duration of operation of the heater 10,
- data containing information about a maximum possible interval $\Delta t$ by which the time of startup of the heater 10 can be shifted,
- data containing information about a power consumption of the heater 10,
- data containing information about the level of priority of the heater 10.

The following data by way of example may be stored in the controller 6 of the refrigerator 3:
- data containing information about a time of startup of the compressor 13, providing that the compressor 13 is controlled time-wise; if the compressor 13 is controlled as a function of the respective instantaneous value of the measured temperature in the refrigerator 3 or if the temperature is regulated, the data about the time of startup of the compressor 13 is generated in the controller 6,
- data containing information about the duration of impending operation of the compressor 13,
- data containing information about a maximum possible interval $\Delta t$ by which the time of startup of the compressor 13 can be shifted,
- data containing information about a power consumption of the compressor 13,
- data containing information about the level of priority of the compressor 13.

The following data relating to the heater 15 by way of example may be stored in the controller 7:
- data containing information about the time of startup of the heater 15 following the start of a drying program,
- data containing information about the duration of operation of the heater 15,
- data containing information about a maximum possible interval $\Delta t$ by which the time of startup of the heater 15 can be shifted, data containing information about the power consumption of the heater 15, data containing information about the level of priority of the heater 15.

A method according to an embodiment of the invention will be described in more detail hereinafter.

All appliances 2, 3, 4 are operated simultaneously. The appliances 2, 3, 4 transmit the data stored in the respective controller 5, 6, 7 to the communication bus 12. The controller 5 of the washing machine 2 therefore taps the data sent by the controller 6 of the refrigerator 3 and by the controller 7 of the tumble dryer 4 at the communication bus 12. The controller 6 of the refrigerator 3 accordingly receives the data which the controller 5 of the washing machine 2 and the controller 7 of the tumble dryer 4 have sent. The controller 7 of the tumble dryer 4 receives data which the controller 5 of the washing machine 2 and the controller 6 of the refrigerator 3 have sent.

One aim for all appliances 2, 3, 4 is to not exceed a predetermined limiting value $P_G$ for an instantaneous total power $P_S$, which is consumed by all appliances 2, 3, 4 and to divide the total power $P_S$ as uniformly as possible over time.

Figure 2A:
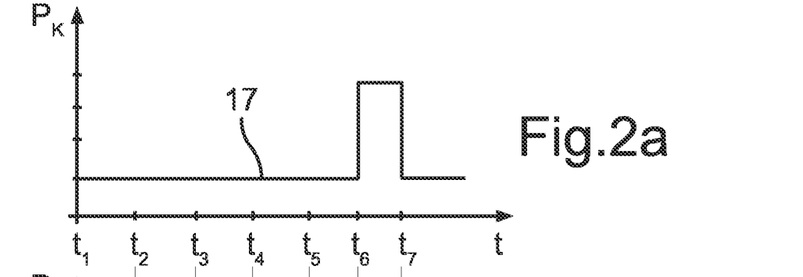
FIGS. 2a to 2d each show in relation to the domestic appliances according to FIG. 1 a characteristic over time of the power consumed and a characteristic over time of a total power, the characteristics describing in detail a method according to one embodiment of the invention.
Figure 2B:
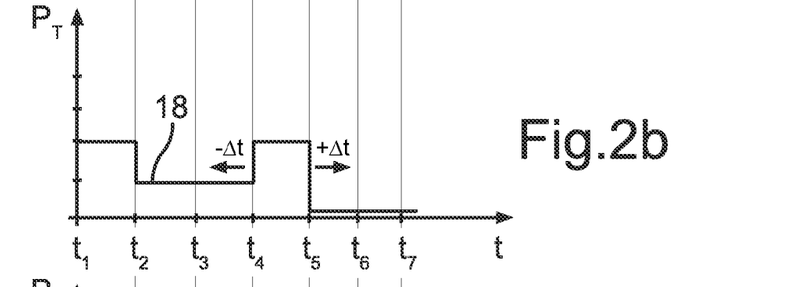
Figure 2C:
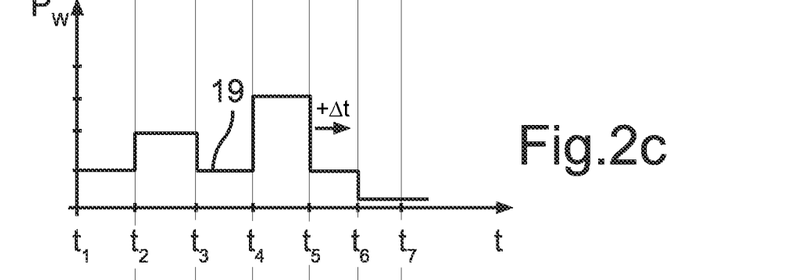
Figure 2D:
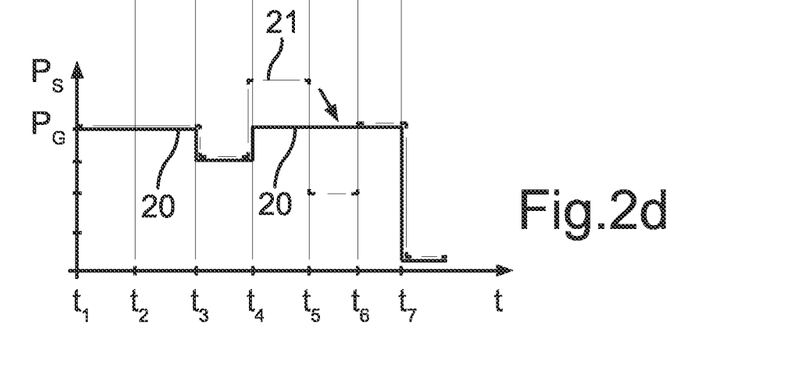

FIGS. 2a to 2d show characteristics over time of the power, namely a characteristic 17 of a power $P_K$ consumed by the refrigerator 3 over time t (FIG. 2a), a characteristic 18 of a power $P_T$ consumed by the tumble dryer 4 over time t (FIG. 2b), a characteristic 19 of a power $P_W$ consumed by the washing machine 2 over time t (FIG. 2c) and a characteristic 20 of the total power $P_S$ consumed by all appliances 2, 3, 4 over time t during operation of the appliances 2, 3, 4 according to the method of the embodiment of the invention, and a characteristic 21 of the total power $P_S$ over time t during operation of the appliances 2, 3, 4 according to the prior art (FIG. 2d).

It emerges from FIG. 2a that from a time $t_1$ to a time $t_6$ the refrigerator 3 should consume relatively little power, namely a single unit of power. Startup of the compressor 13 is envisaged at time $t_6$. Operation of the compressor 13 should last up to a time $t_7$. During operation of the compressor 13, i.e. in the time from $t_6$ to $t_7$, the power $P_K$ is four units. All of this information is already present in the controller 5 of the washing machine 2 as well as in the controller 7 of the tumble dryer 4 which learn of the planned startup of the compressor 13 as early as time $t_1$.

From the data sent by the tumble dryer 4 the washing machine 2 and the refrigerator 3 extract information about the impending characteristic 18 of power $P_T$, as is shown in FIG. 2b. The heater 15 should be started up at time $t_4$. Operation of the heater 15 should last from time $t_4$ to $t_5$. This operation can, however, and this emerges from the data sent by the tumble dryer 4, be shifted and, more precisely, operation of the heater 15 can either be brought forward or postponed by an interval $\Delta t$, and this is shown in FIG. 2b by $-\Delta t$ and $+\Delta t$. Since, as emerges from characteristic 18, startup of the heater 15 increases the power $P_T$ by a unit, during the time $t_4$ to $t_5$ a power consumption of the tumble dryer 4 of a single unit would occur should operation of the heater 15 be shifted. All of this information is already present in the controller 5 of the washing machine 2 and in the controller 6 of the refrigerator 3 with the aid of the received data.

From the data sent by the washing machine 2 the controller 6 of the refrigerator 3 and that of the tumble dryer 4 can extract the characteristic 19 of the power $P_W$ consumed by the washing machine 2, as is shown in FIG. 2c. It is provided that from time $t_1$ to $t_2$ the washing machine 2 consumes a single unit of power $P_W$. From time $t_2$ to time $t_3$ the power consumption of the washing machine 2 is two units. From time $t_3$ to time $t_4$ it is one unit. A spin cycle is to be initiated in the washing machine 2 at time $t_4$. The drive motor 8 should be operated at a high rotational speed for this purpose. The spin cycle should last until time $t_5$. During the spin cycle the washing machine 2 should consume a total of three units of power $P_W$. It also emerges from the data sent by the controller 5 of the washing machine 2 that the spin cycle—as is shown in FIG. 2c by $+\Delta t$—can be postponed, namely the beginning of the spin cycle or startup of the drive motor 8 can be shifted from $t_4$ to $t_5$. The controller 5 of the washing machine 2 can therefore cause the washing machine 2 to consume a total of a single unit of power $P_W$ during time $t_4$ to $t_5$ and a total power $P_W$ of three units during the time $t_5$ to $t_6$. All of this information is present in the controller 6 of the refrigerator 3 and in the controller 7 of the tumble dryer 4.

Data are also stored in the controllers 5, 6, 7 which contain information about the limiting value $P_G$ for the total power $P_S$ and, more precisely, the power consumption of all appliances 2, 3, 4 present in the household should not exceed the limiting value $P_G$. At the same time it should be possible for the appliances 2, 3, 4 to conclude their processes properly.

From the received data the controllers 5, 6, 7 calculate the total power $P_S$, namely for the entire duration of the processes of appliances 2, 3, 4. A characteristic 21 of the total power $P_S$, as is shown in FIG. 2d, therefore results in each controller 5, 6, 7. This characteristic 21 would actually result if the appliances 2, 3, 4 were to carry out their processes without regard for the respective other appliances 2, 3, 4. The controllers 5, 6, 7 determine that the total power $P_S$ during the time $t_4$ to $t_5$ would exceed the limiting value $P_G$, and this would generate a peak load and overload the electrical power supply. However, the controllers 5, 6, 7 also determine that this may be avoided if, firstly, the controller 7 of the tumble dryer 4 brings forward operation of the heater from time $t_4$ to $t_5$ to time $t_3$ to $t_4$ and, secondly, the controller 5 of the washing machine 2 postpones the spin cycle from time $t_4$ to $t_5$ to time $t_5$ to $t_6$. This results in a characteristic 20 of the total power $P_S$, as is shown in FIG. 2d by the solid line. The controllers 5, 6, 7 accordingly determine that with characteristic 20 the limiting value $P_G$ would not be exceeded and appliances 2, 3, 4 would still conclude their processes properly and that, overall, a uniform division of the total power $P_S$ would result.

In other words, operation of the heater 15 is brought forward in the tumble dryer 4, namely to the time $t_3$ to $t_4$. The spin cycle is postponed in the washing machine 2, namely to time $t_5$ to $t_6$.

Overall, a domestic appliance 2, 3, 4, an appliance system and a method are therefore created by which the electrical power supply is unburdened without the processes of the domestic appliances 2, 3, 4 being adversely affected. It is possible for the domestic appliance 2, 3, 4 to coordinate its power consumption with other domestic appliances 2, 3, 4 that are operating at the same time in order to not exceed a limiting value $P_G$ for a total power $P_S$. This takes place, for example, by dynamic shifting of operations of the electrical loads 8, 10, 13, 15. The time by which operation can be shifted is defined as a function of appliance or process. For example appliance-specific parameters, such as temperature, can be taken into consideration here. It is an automated process, i.e. an operator does not have to manually intervene in the respective control of the domestic appliances 2, 3, 4.

LIST OF REFERENCE CHARACTERS 1 house
2 washing machine
3 refrigerator
4 tumble dryer
5, 6, 7 controller 8 drive motor
9 washing drum
10 heater
11, 14, 16 communication device
12 communication bus
13 compressor
15 heater
17, 18, 19, 20, 21 characteristic
$P_S$ total power
$P_G$ limiting value for the total power
$P_K$, $P_T$, $P_W$ powers

The invention claimed is:

1. A domestic appliance, comprising:
an internal electrical load;
a controller for controlling the internal electrical load; and
a communication device coupled to the controller,
wherein the controller is configured in at least one of two ways;
a first way in which data is transmitted via the communication device to at least one additional domestic appliances, wherein the transmitted data include information about a time of an impending startup of the internal electrical load; and
a second way in which data is received via the communication device from said at least one additional domestic appliance, the received data including information about a time of an impending startup of an electrical load of said at least one additional domestic appliance,
wherein the controller is configured to control the internal electrical load by shifting the time of the impending startup of the internal electrical load based on the received data,
wherein the controller is configured to shift the time of the impending startup of the internal electrical load based on the received data without manual intervention of an operator; and
wherein the transmitted data are stored in the controller and define a maximum possible time interval by which a time for the impending startup of the internal electrical load can be shifted, and the received data include information about a maximum possible time interval by which a time of the impending startup of the electrical load of the at least one additional domestic appliance can be shifted; and
wherein the transmitted data are stored in the controller and define respective maximum possible time intervals associated with different programs or with different program sections of a program, wherein the time of the impending startup of the internal electrical load is shifted in a program or in a program section based on the associated maximum possible time intervals.

2. The domestic appliance of claim 1, wherein the transmitted data include information about a duration of an impending operation of the internal electrical load, and the received data include information about a duration of an impending operation of an electrical load of said at least one additional domestic appliance.

3. The domestic appliance of claim 1, wherein the transmitted data are stored in the controller and include an estimated or an actual power consumption of the internal electrical load, and the received data include information about a power consumption of an electrical load of said at least one additional domestic appliance.

4. The domestic appliance of claim 1, wherein the transmitted data are stored in the controller and include a level of priority of the internal electrical load, and the received data include information about a level of priority of an electrical load of said at least one additional domestic appliance.

5. The domestic appliance of claim 1, wherein an impending operation of the internal electrical load is divided over time based on the information contained in the received data.

6. The domestic appliance of claim 5, wherein the internal electrical load is controlled based on the information contained in the received data such that a total power consumed by the domestic appliance and by the at least one additional domestic appliance does not exceed a predetermined limiting value.

7. An appliance system, comprising at least a first domestic appliance and a second domestic appliance, each domestic appliance comprising:
an internal electrical load,
a controller for controlling the internal electrical load and a communication device coupled with the controller,
wherein the controller is configured to exchange data via the communication device between at least the first domestic appliance and the second domestic appliance, said exchanged data including information about a time of an impending startup of a respective internal electrical load of at least the first domestic appliance and the second domestic appliance,
wherein the controller is configured to control the internal electrical load by shifting the time of the impending startup of the internal electrical load based on the received data,
wherein the controller is configured to shift the time of the impending startup of the internal electrical load based on the received data without manual intervention of an operator,
wherein the transmitted data are stored in the controller and define a maximum possible time interval by which a time for the impending startup of the internal electrical load can be shifted, and the received data include information about a maximum possible time interval by which a time of the impending startup of the electrical load of the at least one additional domestic appliance can be shifted; and
wherein the transmitted data are stored in the controller and define respective maximum possible time intervals associated with different programs or with different program sections of a program, wherein the time of the impending startup of the internal electrical load is shifted in a program or in a program section based on the associated maximum possible time intervals.

8. The appliance system of claim 7, wherein the exchanged data include information selected from the group consisting of a duration of an impending operation of the respective internal electrical load of at least the first domestic appliance and the second domestic appliance, a maximum possible interval by which a time of startup of the respective internal electrical load of at least the first domestic appliance and the second domestic appliance, an estimated or an actual power consumption of the respective internal electrical load of at least the first domestic appliance and the second domestic appliance, and a level of priority of the respective internal electrical load.

9. A method for operating a domestic appliance, comprising:
controlling an internal electrical load using a controller; and
operating the controller in at least one of two ways:
a first way in which data is transmitted from the domestic appliance to at least one additional domestic appliance via a communication device, the transmitted data, including information about a time of an impending startup of the internal electrical load; and a second way in which data is received at the domestic appliance from the at least one additional domestic appliance, the received data including information about a time of an impending startup of an electrical load of said at least one additional domestic appliance, wherein controlling the internal electrical load using the controller further comprises shifting the time of the impending startup of the internal electrical load based on the received data, wherein controlling the internal electrical load using the controller further comprises shifting the time of the impending startup of the internal electrical load based on the received data without manual intervention of an operator, and wherein the transmitted data are stored in the controller and define a maximum possible time interval by which a time for the impending startup of the internal electrical load can be shifted, and the received data include information about a maximum possible time interval by which a time of the impending startup of the electrical load of the additional domestic appliance can be shifted, and wherein the transmitted data are stored in the controller and define respective maximum possible time intervals associated with different programs or with different program sections of a program, and wherein controlling the internal electrical load using the controller comprises shifting the time of the impending startup of the internal electrical load in a program or in a program section based on the associated maximum possible time intervals.

10. The method of claim 9, wherein the transmitted data include information about a duration of an impending operation of the internal electrical load, and the received data include information about a duration of an impending operation of the electrical load of said at least one additional domestic appliance.

11. The method of claim 9, wherein the transmitted data are stored in the controller and include an estimated or an actual power consumption of the internal electrical load, and the received data include information about a power consumption of an electrical load of said at least one additional domestic appliance.

12. The method of claim 9, wherein the transmitted data are stored in the controller and include a level of priority of the internal electrical load, and the received data include information about a level of priority of an electrical load of said at least one additional domestic appliance.

* * * * *